Figures 1, 11:
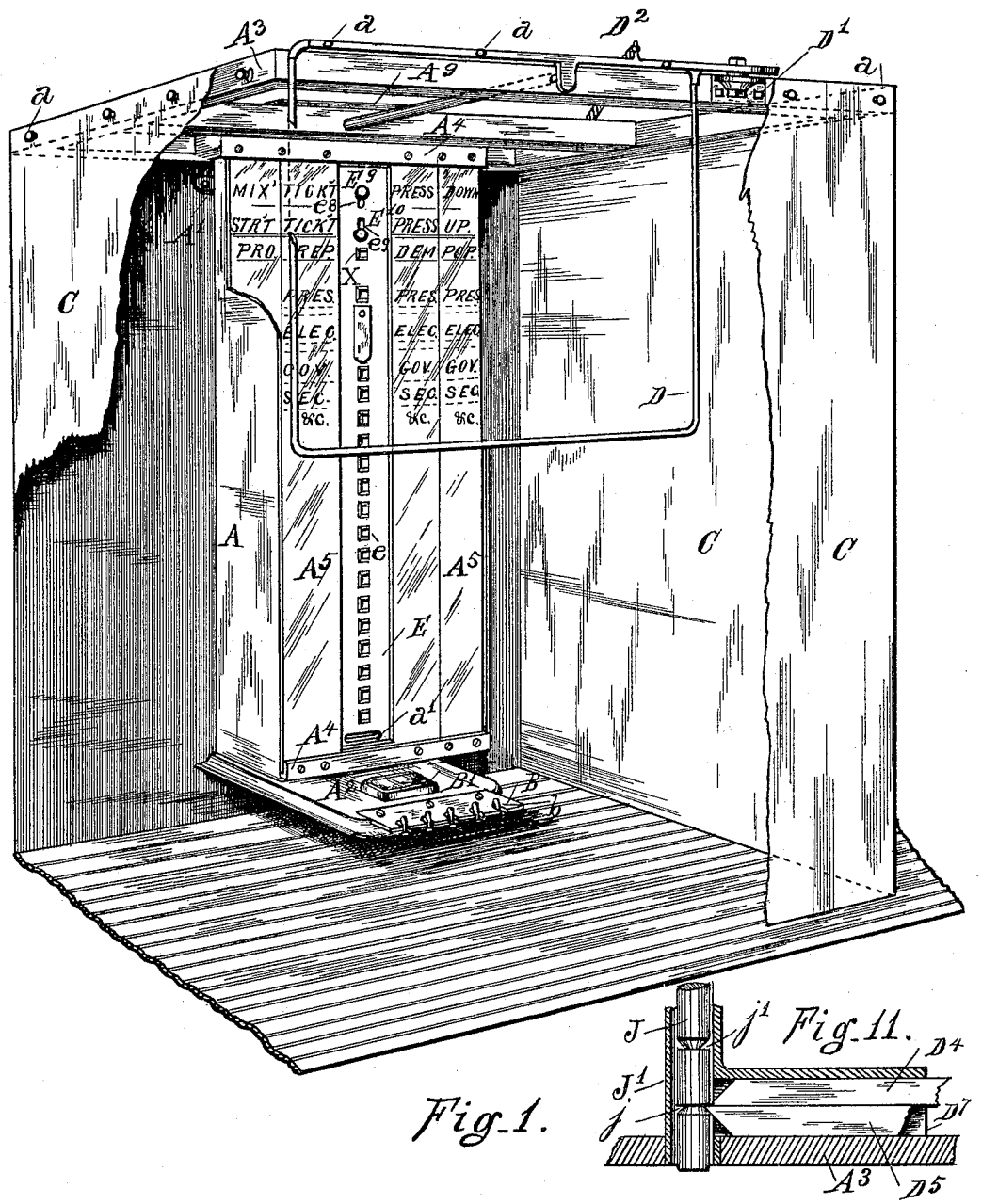

(No Model.)

5 Sheets—Sheet 1.

W. A. SWAREN.
VOTE RECORDING MACHINE.

No. 569,682.   Patented Oct. 20, 1896.

Witnesses.
Frank B. Henney.
Frank Hudson

Inventor.
William A. Swaren.
by Atty N. DuBois.

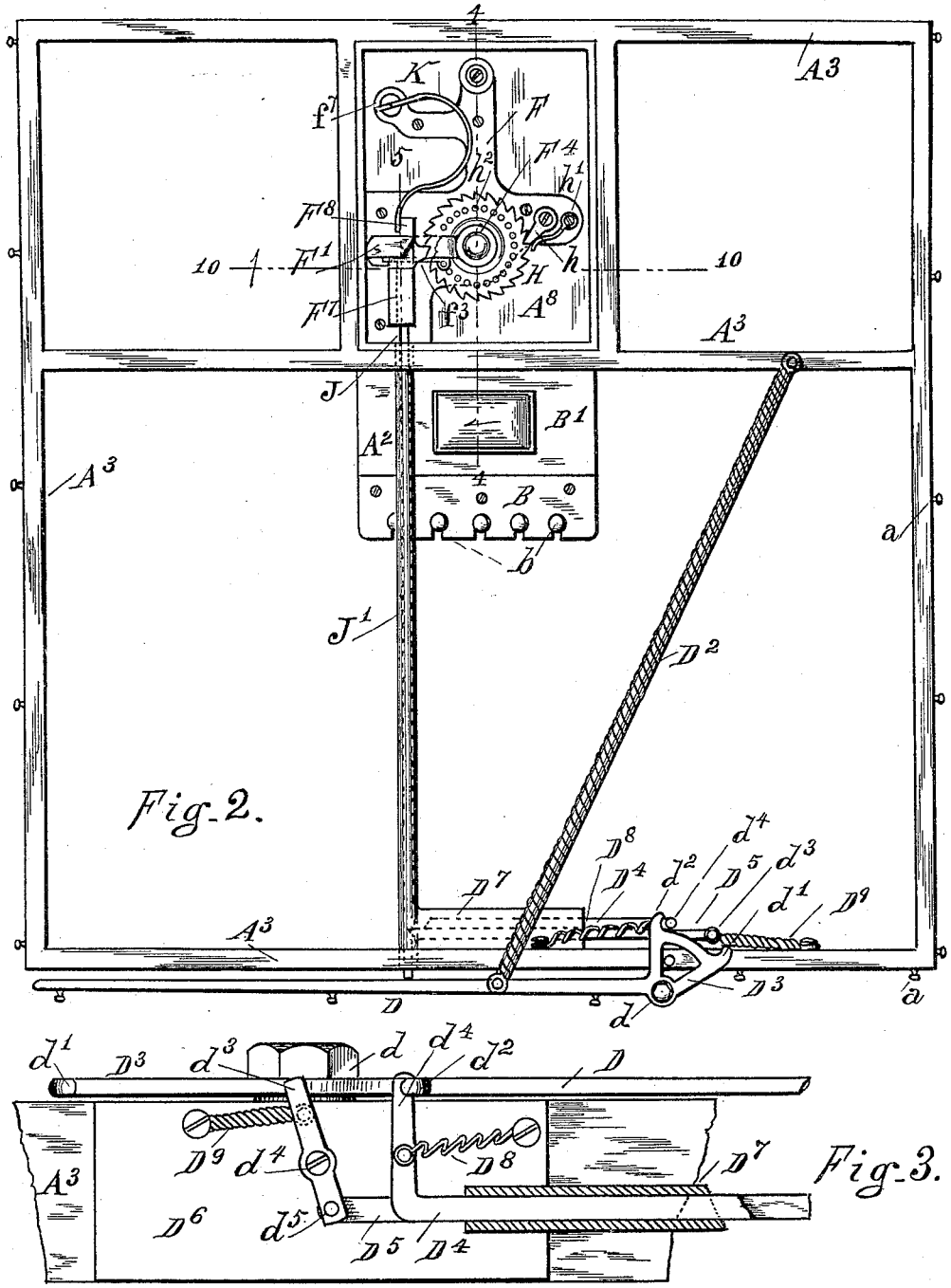

(No Model.) 5 Sheets—Sheet 3.
W. A. SWAREN.
VOTE RECORDING MACHINE.
No. 569,682. Patented Oct. 20, 1896.
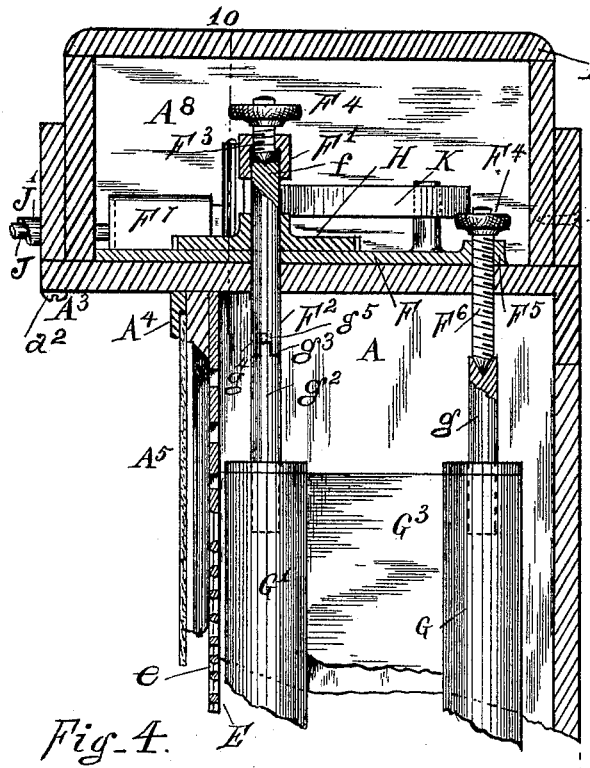
Fig. 4.
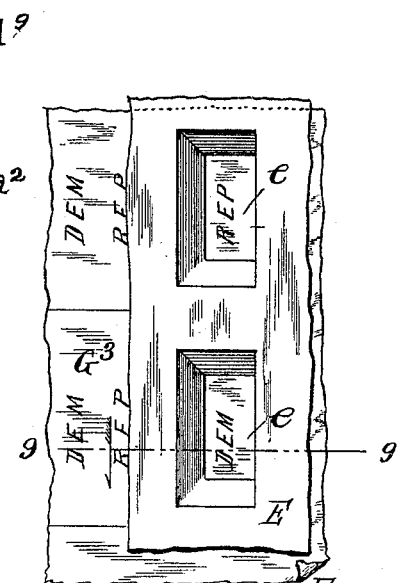
Fig. 8.
Fig. 9.
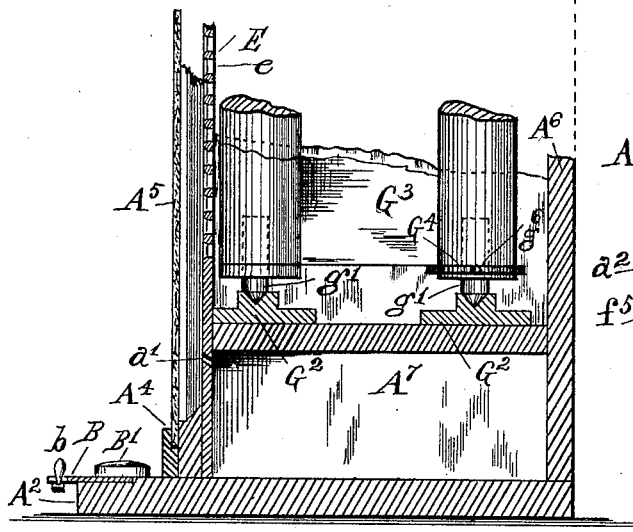
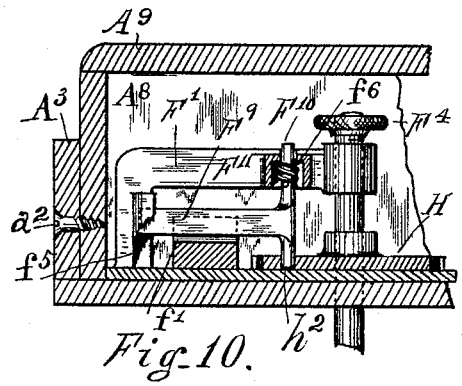
Fig. 10.
Witnesses.
Frank B. Henney
Frank Hudson
Inventor
William A. Swaren.
by Atty N. DuBois,

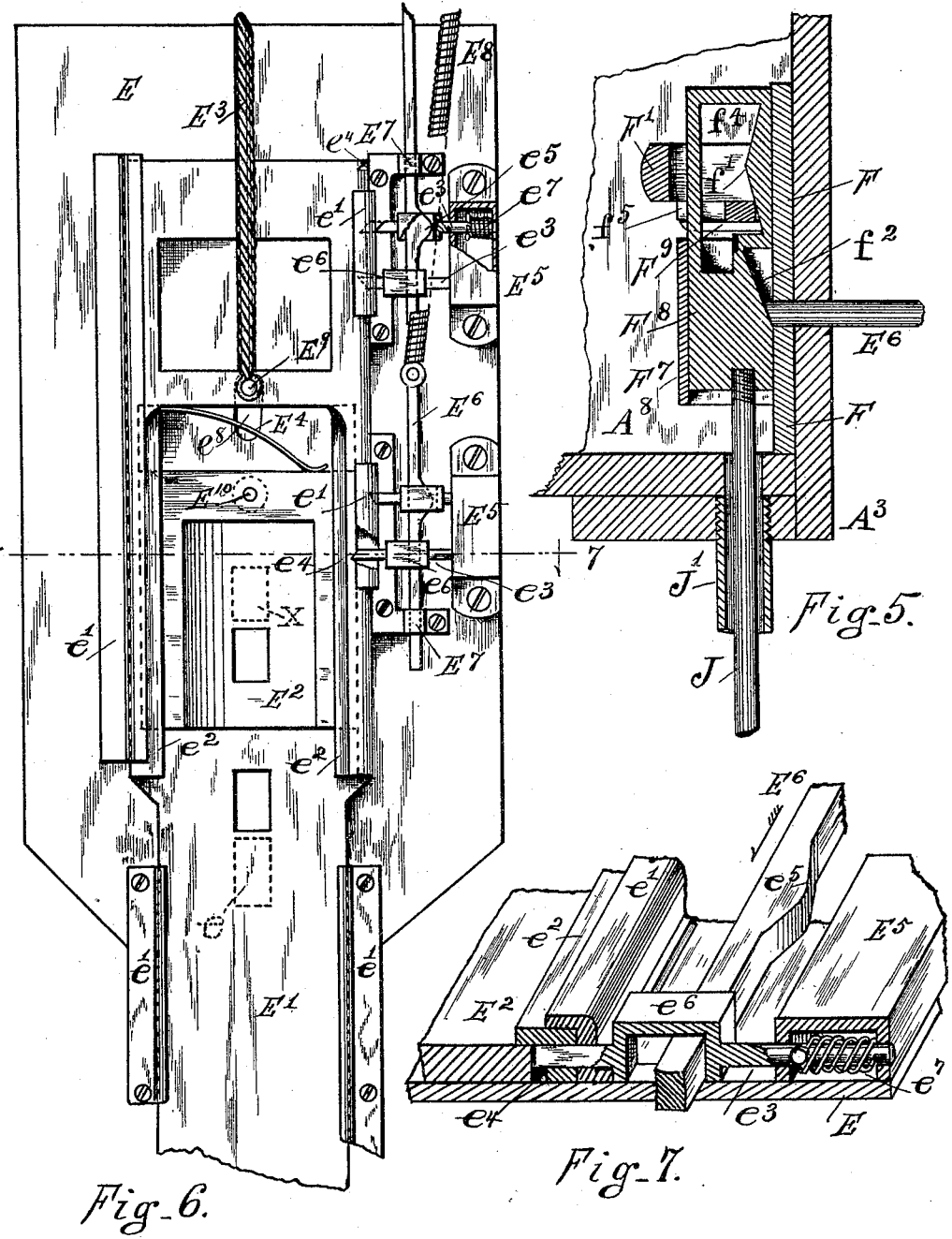

(No Model.) 5 Sheets—Sheet 5.

W. A. SWAREN.
VOTE RECORDING MACHINE.

No. 569,682. Patented Oct. 20, 1896.

Witnesses.
Frank B. Henney.
Frank P. Anderson

Inventor.
William A. Swaren,
by Atty. N. DuBois.

UNITED STATES PATENT OFFICE.

WILLIAM A. SWAREN, OF OBLONG, ILLINOIS.

VOTE-RECORDING MACHINE.

SPECIFICATION forming part of Letters Patent No. 569,682, dated October 20, 1896.

Application filed May 16, 1895. Serial No. 549,558. (No model.)

*To all whom it may concern:*

Be it known that I, WILLIAM A. SWAREN, a citizen of the United States, residing at Oblong, in the county of Crawford and State of Illinois, have invented a certain new and useful Method of and Apparatus for Recording Votes, of which the following is such a full, clear, and exact description as will enable those skilled in the art to which it pertains to make and use my said invention.

The primary and special purposes of my invention are to provide a simple and effective system or method for casting and recording votes, also to provide simple and effective mechanical means for utilizing and applying said system or method for casting and recording all the votes for each and every office for which candidates are voted for at any election at which the method and apparatus for casting and recording votes may be used.

In order to clearly set forth the essential difference in general principle and operation, aside from the novel features of mechanical construction of the apparatus, wherein my method of casting and recording votes differs from all other methods or systems for casting and recording votes heretofore known or used, I here call attention to the fact that in all of the systems or methods for mechanically casting and recording votes heretofore known or used the vote-casting or vote-registering devices of whatever kind have been designed and applied to record the votes as cast for the individual candidates whose names appear on the tickets. Hence any vote-recording apparatus successfully operative under that system must have as many recording devices or mechanisms as there are candidates to be voted for.

My method and apparatus for recording votes differs from the system of vote-recording and the machines of the class which I have just described in this very important particular, viz: that under my system of vote-recording the votes are cast and recorded for the respective candidates by such means as to necessitate only one voting device for each office, instead of and in contradistinction to a voting device for each and every candidate for each and every office named on all of the official ballots. For example, assume that there are four parties in the field, each party having a candidate for the respective offices to be voted for at the election. Assume that the vote is to be cast and recorded for the office of governor, and that John Smith, William Jones, James Wood, and Thomas Johnson are the Republican, Democratic, Prohibition, and Populist candidates, respectively. Under the systems of mechanical vote-recording heretofore known and used in order to vote for four candidates for the office of governor, as above indicated, it is necessary to have four separate and distinct vote-recording mechanisms, one for each candidate, and so for every office for which a candidate is named on each party ticket there must be as many separate and independent vote-recording mechanisms as there are candidates named for that office on all the tickets. That is to say, if there are four tickets with ten candidates on each ticket forty separate and independent vote-recording mechanisms will be required in order to cast and record the votes for all the candidates.

Under my system of vote-recording one mechanism will serve to record all the votes cast for all of the candidates for one office, no matter how many candidates there may be for that office, and the number of mechanisms required to record the entire vote cast will be limited by the number of offices for which candidates are named to be voted for. In the assumed case above stated, in order to cast and record the whole vote under my system, for four tickets each having ten candidates, only ten separate and distinct vote-recording devices will be required as against forty separate and distinct vote-recording devices required under any of the systems heretofore known or used. It is obvious, therefore, that my method of vote-recording as hereinafter set forth is of very great practical utility and advantage not only on account of its great simplicity and precision in application by reason of which mistakes in voting are almost impossible, but also on account of the comparatively insignificant first cost of the apparatus required for the application and operation of the system.

The apparatus which I have designed for the purpose and have found most effective in the practical execution of my method of casting and recording votes in its preferable form consists of means adapted to present a sheet or slip of paper or other suitable fabric, impression medium, or material on which the votes are to be recorded opposite and contiguous to a series of apertures in a perforated plate in such position that the vote to be recorded may be written, marked, stamped, punched, or otherwise impressed or designated on said strip through said apertures; means adapted to write, mark, stamp, punch, impress, or otherwise designate on said strip the vote which is to be cast and recorded, and means adapted to move said sheet or strip of paper or other suitable fabric or material step by step across the apertures in said plate, so as to successively present at each movement of the sheet or strip a new and unused part of said sheet or strip contiguous to each of said apertures, whereon the votes of the successive voters may be recorded.

My vote-recording mechanism in its preferable form is hereinafter fully disclosed, but other suitable mechanism may be employed without departing from the spirit of my invention so far as it relates to the system or method of voting and recording whereby one voting mechanism for each office is used, in contradistinction to a multiplicity of voting mechanisms for the several individual candidates for each office, the herein-described improvement in the art of casting and recording votes consisting in the employment of an impression medium adapted to receive imprints, and the coördinate employment in, substantially the manner described, of means adapted to imprint party designations in legible characters on said impression medium in conjunction with the simultaneous employment of means adapted to expose to view in position to receive imprints certain limited parts of said impression medium corresponding in number and position with the designations of the offices for which there are candidates to be voted for, irrespective of the number of said candidates, and means adapted to exhibit official designations corresponding in number and position to the number and position of the exposed parts of said impression medium, also adapted to exhibit the names of all the candidates of the several parties for the respective offices in range with the exposed part of the impression medium corresponding to the office for which each of said candidates stands, substantially as set forth.

In the construction of my vote-recording apparatus hereinafter described the purposes to be obtained are to provide a frame or cabinet of novel and improved construction adapted to support and contain the operating parts of the mechanism, also adapted to support curtains forming a booth within which the voter may have entire privacy in the casting and recording of his vote; to provide novel and improved means for detachably connecting the cabinet with the wall of a building or other suitable support; to provide novel and improved means for intermittently moving a strip of paper or fabric across and contiguous to apertures in a plate on said cabinet through which the vote to be recorded may be stamped or impressed on said strip of paper; to provide simple and effective means to facilitate the insertion, adjustment, and removal of the rolls within the cabinet carrying the strip of paper on which the votes are recorded; to provide a face-plate of novel and improved construction having a series of perforations corresponding in number and position to the number and designation of the official ballots of the several offices for which candidates are named by the several parties, respectively, to be voted for at an election; to provide automatic slides and means for operating same, adapted to move over and close all of the voting-apertures in the face-plate when and during all the time that the door of the voting-booth is open; to provide a slide movable by the voter only when the door of the booth is closed and adapted to open an aperture for voting the "straight ticket," said slide being so constructed and arranged relative to the other parts of the mechanism that when the straight-ticket aperture is open all the other apertures are closed, and the slide closing the said other apertures is locked in position, so that it may not be moved until after the door of the booth has been again opened and closed; to provide a slide movable by the voter only when the door of the booth is closed and adapted to open apertures for voting a mixed ticket, said slide being so constructed and arranged relative to the other parts of the mechanism that when it is moved to open the apertures necessary for the voting of the mixed ticket the moving of said slide automatically locks in closed position the slide controlling access to the straight-ticket aperture, so that a straight ticket and a mixed ticket may not both be voted by the same voter; to provide double locks coöperating with the upper and lower slides controlling the opening and closing of the apertures in the face-plate, so constructed and arranged that as the upper or short slide is moved up it automatically locks the lower long slide and prevents downward movement thereof, and as the lower or long slide is moved downward it automatically locks the upper slide and prevents upward movement thereof; to provide a door or gate for the voting-booth so constructed and arranged relative to the other parts of the mechanism that the closing of the door will automatically unlock both of the slides on the face-plate, so that the short slide may be moved up once only or the long slide may be moved down once only at the pleasure of the voter; to provide means adapted to facilitate full opening and complete closing of the door of the booth to the end that several locks connected with the door may operate with precision; to provide locking mechanism connected with and operated by the door of the voting-booth adapted to lock the mechanism actuating the rolls carrying the strip of paper on which the votes are recorded, so that said rolls may not be moved when the door of the booth is open; to provide simple and effective means whereby the strip of paper on which the votes are to be recorded may be moved one step or increment only by the act of closing the door, and after having been thus moved one step may not be again moved until the door has again been opened and closed sufficiently to engage with the mechanism actuating the rolls carrying the strip of paper; to provide locking mechanism coöperating with the rolls carrying the strip of paper on which the votes are recorded, so constructed and arranged that the strip of paper will, by the closing of the door, be moved one step, but after the door is closed the locking mechanism will intervene to prevent any further movement of the strip until the locking mechanism is disengaged or unlocked; to provide a face-plate having apertures so formed as to afford ample facility for recording the votes in full view of the voter and adapted to prevent the inspection of previously-recorded votes; to provide novel and improved means for stamping on the strip of paper the votes cast by each voter, so that all of the votes at any election may be easily read and conveniently counted and summarized for each candidate with respect to the offices for which said candidates stand; to provide means for supporting the stamps in convenient position on the cabinet; to provide means for detachably connecting with the cabinet the official ballots on which are printed the names of the candidates of the several parties for the respective offices; to provide a frame adapted to support curtains forming a voting-booth, said frame being so constructed and arranged that it may be easily attached to the cabinet or detached from it for convenience in storage and transportation; to provide means for the protection of the official tally-sheet on which the votes are recorded, so constructed and arranged that access may be had to the tally-sheet only by removing the cabinet from its supporting wall or structure; to provide simple and effective means of improved construction for detachably connecting with the cabinet the rolls carrying the official tally-sheet; to provide simple and effective means for regulating the tension on the rolls carrying the official tally-sheet, and to provide a tally-sheet of novel and improved form adapted to facilitate the recording, counting, and summarizing of all of the votes cast.

With these ends in view my invention consists of certain novel features of construction and combination of parts shown in the annexed drawings, to which reference is hereby made, and hereinafter particularly described and specifically claimed.

Figures 12, 13:
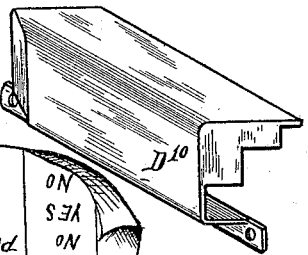

In the drawings, Figure 1 is a perspective view of the apparatus, a part of the curtains of the booth being shown as broken away so as to more clearly illustrate the position and relation of the parts. Fig. 2 is an enlarged top plan view of the apparatus, the top of the box containing the mechanism at the upper end of the cabinet being removed, so as to show the mechanism inside of the box. Fig. 3 is an enlarged partial inside elevation and sectional view of the locking mechanism connected with and operated by the gate. Fig. 4 is an enlarged partial vertical longitudinal section on the line 4 of Fig. 2. The slide and its locking mechanism are omitted from this view. Fig. 5 is an enlarged partial vertical section on the line 5 of Fig. 2. Fig. 6 is an enlarged elevation of the slides and the locks operating with same as viewed from the inside of the cabinet. Fig. 7 is an enlarged transverse sectional view on the line 7 of Fig. 6. Fig. 8 is an enlarged detached elevation of a part of the face-plate and illustrates the form of the apertures in the face-plate. Fig. 9 is a transverse section on the line 9 of Fig. 8. Fig. 10 is an enlarged partial transverse vertical section on the line 10 of Fig. 2 and illustrates the means for locking the ratchet-wheel. Fig. 11 is an enlarged detached top plan and section view of that part of the cam-actuating rod and its inclosing tube adjacent to the gate and shows the notches near the outer end of the rod. This view also shows the slides connected with and operated by the gate which serve to lock the rod in its different positions. Fig. 12 is an enlarged detached perspective view of the cap covering and inclosing that part of the locking mechanism which is adjacent to and operated by the gate. Fig. 13 is an enlarged plan of part of the tally-sheet.

Similar letters of reference designate like parts in all of the views.

The cabinet A is in the form of a rectangular box. Plates A' are secured to the cabinet near its upper end and serve to support the cabinet on the wall of a building or on any other suitable supporting structure. A base $A^2$ is secured to the lower end of and projects in front of the cabinet. On the front edge of the base $A^2$ is a metal rack B, which serves to support rubber stamps $b$. An inking-pad B', of any suitable and convenient form for use with rubber stamps, is placed on the base $A^2$. The rubber stamps $b$ may be of any suitable and convenient form and are preferably designated by number, color, or emblem, so that the voter who cannot read may readily select the stamp necessary for use in casting his votes for the candidates of the party of his choice. A rectangular frame $A^3$ is detachably connected with the cabinet by screws $a^2$ or other suitable means. This frame is made detachable for convenience in storage or transportation. The frame $A^3$ supports the curtains C, which form the voting-booth which incloses the cabinet so that the voter may cast his vote in complete privacy. The curtains C are connected with the frame $A^3$ and the gate D by means of buttons $a$.

The gate D is supported on a bracket D', secured to the front of the frame $A^3$, and the gate turns on the bolt $d$, connected with the bracket. A spring $D^2$ has one of its ends connected with the gate D and its other end connected with the inside cross-piece of the frame $A^3$, and the spring serves to automatically cause complete opening of the gate when the gate is swung in one direction and complete closing of the gate when swung in the opposite direction. This is effected in the following manner: When the gate is closed, as shown in Fig. 2, the spring $D^2$ is under sufficient tension to keep the gate closed. When the gate is opened by hand, it turns on the bolt $d$ and continues to stretch the spring until the gate reaches a position perpendicular to the front of the frame $A^3$. As soon as the gate has passed the perpendicular position the spring begins to react and will contract sufficiently to swing the gate to its wide-open position parallel to the front of the frame $A^3$.

Channeled bars $A^4$ are connected with the front of the cabinet and serve to retain in place glass plates $A^5$, which cover and protect the official ballots.

In the back of the cabinet is a door $A^6$, (see Fig. 4,) which affords access to the interior of the cabinet. This door is secured and guarded by locks, (not shown in the drawings,) which may be of any suitable and convenient form.

Near the lower end of the cabinet is a floor $A^7$, on which the rolls carrying the strip of paper are supported. The space between the floor $A^7$ and the base $A^2$ forms a separate compartment adapted to receive miscellaneous tickets, as hereinafter set forth.

A box $A^8$, secured to the upper end of the cabinet, contains the mechanism actuating the paper-rolls. This box is provided with a suitable cover $A^9$, adapted to securely close the box, so as to prevent tampering with the mechanism.

The perforated plate E is secured to the inside of the front of the cabinet. This plate has a straight-ticket aperture X and a series of perforations $e$ corresponding in position to the names of the offices on the official ballots, as hereinafter explained. There is practical advantage in making the apertures $e$ X in the face-plate E with three bevel edges and one straight edge, as shown, for the reason that the bevel edges facilitate the insertion of the rubber stamps for imprinting the vote on the strip of paper and the straight or abrupt edge intercepts the view, so that it is impossible to look under the edge of the aperture and see the preceding vote which has been stamped on the strip.

The plate F is secured to the bottom of the box $A^8$. A standard F', integral with the plate F, has a vertical central bore $f$, adapted to accommodate the upper end of the shaft $F^2$. A cone-pointed screw $F^3$ works in a female screw in the standard F' and its cone-point fits in a conical recess in the upper end of the shaft $F^2$. Jam-nuts $F^4$ serve to retain the screws $F^3$ and $F^6$ in position after they have been properly adjusted, as hereinafter explained. On the upper side of the plate F is an integral boss $F^5$. The screw $F^6$ works in the boss $F^5$ and its cone-pointed end fits in the upper end of the spindle $g$ of the rolls G. The spindle $g^2$ of the roll G' has at its upper end a tenon $g^3$, which fits in a corresponding mortise $g^4$ in the lower end of the shaft $F^2$ and serves to connect the spindle with the shaft in an obvious manner. A center pin $g^5$ facilitates the connection and alinement of the spindle $g^2$ with the shaft $F^2$.

The screws $F^3$ and $F^6$ control the tension of the tally-sheet $G^3$ on the rolls G and G'. The tension is regulated by turning the screws down until the ends of the screws press upon the spindles of the rolls with sufficient force to produce the requisite tension. The jam-nuts $F^4$ are then turned down to firmly hold the screws, so that they will not be turned by the rotation of the rolls. At the lower end of the rolls G and G' are cone-pointed spindles $g'$, which turn in recessed plates $G^2$, which are secured to the floor $A^7$. A collar $G^4$ is longitudinally adjustable on the roll G and is detachably connected with the roll by means of a set-screw $g^6$. By moving the collar $G^4$ up or down the roll may be made to accommodate tally-sheets of different widths. In order to remove the rolls G G', the screws $F^6$ and $F^3$ are turned to withdraw the cone-points from the end of the spindle $g$ and the end of the shaft $F^2$, respectively. The roll G may then be removed. The shaft $F^2$ may then be raised sufficiently to disengage the tenon $g^3$ from the mortise $g^4$, and the roll G' may then be removed. To insert the rolls G and G', this operation is reversed. A strip of paper $G^3$ is wound around the roll G and is suitably connected with the roll G'. As the roll G' is intermittently rotated step by step the paper is unwound from the roll G and is wound around the roll G'. The votes cast are recorded on the strip $G^3$ by means of rubber stamps $b$, inserted through the apertures $e$ or X, imprinting the votes on that part of the paper lying on the roll G' adjacent to the apertures $e$ X. The ratchet-wheel H is secured to and turns with the shaft $F^2$. The pawl $h$ is supported on the plate F and engages with the teeth of the ratchet-wheel H to prevent backward movement of the wheel. A spring $h'$ retains the pawl in engagement with the teeth of the ratchet-wheel. In the ratchet-wheel H is a series of holes $h^2$ corresponding in number and position to the teeth of the ratchet-wheel. These holes are adapted to accommodate a bolt by means of which the wheel is locked in position immediately after each movement thereof. A guide $F^7$ is integral with the plate F, and the cam-slide $F^8$ works in the guide $F^7$.

The rod J screws into the front end of the slide $F^8$ and is inclosed in the tube $J'$, which extends across the frame $A^3$. The end of the rod projects beyond the front cross-piece of the frame $A^3$, so that during the operation of closing the gate the gate will engage with the projecting end of the rod to push the rod inward, as clearly shown in Fig. 2. The slide $F^8$ has two integral cams, viz., the double cam $f'$ and the lower cam $f^2$. (See Fig. 5.) On one side of the slide $F^8$ is an integral laterally-projecting pawl $f^3$, (see Fig. 2,) which engages with the teeth of the ratchet-wheel H, so that as the slide reciprocates it imparts an intermittent rotary motion to the ratchet-wheel and the connected roll $G'$. In the slide $F^8$ is an opening $f^4$, through which the transverse bar $F^9$ passes. One end of the bar $F^9$ slides in a vertical channel $f^5$ in the standard $F'$. (See Fig. 10.) The other end of the bar is connected with a vertical bolt $F^{10}$, which slides in a suitable housing $F^{11}$ on the side of the standard $F'$. In the housing $F^{11}$ and surrounding the bolt $F^{10}$ is a coiled spring $f^6$, which is compressed by the raising of the bolt and reacts to push the bolt downward, so as to cause the lower end of the bolt to enter the holes $h^2$ in the ratchet-wheel H, thereby locking the wheel immediately after each movement thereof, so as to prevent any further forward movement of the wheel until the locking-bolt has again been lifted. The locking-bolt is lifted by the cam $f'$ passing under the bar $F^9$ and raising the bar, which raises the bolt with which the bar is connected.

A curved spring K has one end secured to a stud $f^7$, which is integral with the plate F. The other end of the spring presses against the projecting end of the cam-slide $F^8$. The spring K (see Figs. 2 and 4) has a double action; that is to say, it presses in a direction transverse to the slide and serves to retain the pawl $f^3$ in engagement with the teeth of the ratchet-wheel H. It also reacts to push the slide $F^8$ outward after the spring has been compressed by inward movement of the slide.

I will now describe the slides and the means for operating the same, whereby the apertures in the face-plate E may be opened to enable the voter to vote either a straight ticket or a mixed ticket of his choice, all other apertures being closed and locked against him. On the inner side of the face-plate E (see Fig. 6) there are two slides $E'$ and $E^2$. The slide $E'$ moves in guides $e'$, secured to the face-plate, and is operated by means of the knob $E^9$ (see Fig. 1) working in the slot $e^8$ in the face-plate E. The slide $E^2$ moves in guides $e^2$ in the slide $E'$, and is operated by means of a knob $E^{10}$ working in a slot $e^9$ in the face-plate E. A spring $E^3$ has its upper end secured to the top of the cabinet and its lower end connected with the slide $E'$. When the slides and latches are in the position shown in Fig. 6, the gate of the booth is open, all the apertures in the face-plate are closed, and both of the slides are locked in position, as hereinafter explained. When the slide $E'$ is in the position shown in Fig. 6, the spring $E^3$ is relaxed. When the slide $E'$ is pushed down, the spring $E^3$ is stretched, so that when the lock which holds the slide is relaxed the spring will react to pull the slide $E'$ upward. The upper end of the spring $E^4$ is secured to the slide $E'$ and its lower end impinges against the upper edge of the slide $E^2$. The slide $E^2$ moves in guides in the slide $E'$, and when the slide $E^2$ is pushed upward the spring $E^4$ is also pressed upward until the upper edge of the slide $E^2$ abuts against the spring $E^4$, lying parallel to the adjacent horizontal edge of the slide $E'$. Parallel to one edge of the slide $E'$ are two exactly similar locks $E^5$. Each of these locks has two horizontal bolts $e^3$, adapted to engage with notches $e^4$ in the edges of the slides $E'$ and $E^2$. The bolts in the upper lock engage only with the slide $E'$, and the bolts in the lower lock engage only with the slide $E^2$. The upper bolt in the upper lock engages in a notch $e^4$ in the slide $E'$, to prevent upward movement of the slide, and the lower bolt in the upper lock engages in a similar notch to prevent downward movement of the same slide. The upper bolt in the lower lock engages in a notch $e^4$ in the edge of the slide $E^2$ to prevent downward movement of the slide, and the lower bolt of the lower lock engages in a similar notch in the slide $E^2$ to prevent upward movement of the slide. A rod $E^6$ moves vertically in guides $E^7$, secured to the back of the face-plate.

A coiled spring $E^8$ has its upper end secured to the top part of the cabinet and its lower end connected with the rod $E^6$. The spring is stretched by downward movement of the rod and reacts to pull the rod upward. On the rod $E^6$ are integral double cams $e^5$, which engage with the interior faces of the box-loops $e^6$ on the bolts $e^3$ to successively move the bolts in or out as the slide moves up or down. For example, when the rod $E^6$ is in the position shown in Fig. 6, the upper cam $e^5$ is in engagement with the upper bolt of the upper lock and holds that bolt out of engagement with the notch in the slide $E'$, and similarly the lower cam holds the upper bolt of the lower lock out of engagement with the notch in the edge of the slide $E^2$. If now the rod $E^6$ be pushed downward, the cam $e^5$ will be disengaged from the upper bolts of both locks, permitting the lock-springs $e^7$ to react and push both of the upper bolts inward into position to engage with the notches in the slide $E'$ and $E^2$, respectively. If the rod $E^6$ be pushed still further downward, as will be done in closing the gate of the booth, the cams $e^5$ will engage with the lower bolts of both locks, so as to move both of said lower bolts outward and simultaneously disengage them from the notches in both slides. The upper end of the rod $E^6$ projects through the bottom of the box at the top of the cabinet and lies directly under the slide $F^8$ in position to be operated by the cam $f^2$ on the under side of the slide. (See Fig. 5.) The slide $F^8$ is connected with the inner end of the rod J, which is moved longitudinally within the tube J' by the pressure of the gate D against the outer end of the rod as the gate is closed.

The under side of the slide F⁸ is recessed, as shown at $f^2$, so that when the slide is pushed inward the cam-faced under surface of the slide rides on the end of the rod E⁶ and presses the rod down, thereby causing the rod to unlock both of the slides E' and E². It is obvious that so long as the gate remains open and there is no pressure against the end of the rod J in the tube J' both of the slides E' and E² will cover and close all of the apertures in the face-plate and both will be locked so that neither one may be moved either up or down. In other words, no opening is presented wherein any vote may be stamped until after the voter has entered the booth and closed the gate after him.

When the parts are in position, as shown in Fig. 6, the gate of the booth is open, the slide E' is locked by the lower bolt of the upper lock and cannot be moved down to open the mixed-ticket apertures $e$, the slide E² is locked by the lower bolt of the lower lock and cannot be moved up to open the straight-ticket aperture X, and the springs E³ and E⁸ are both relaxed.

When the rod E⁶ is pushed down by the cam on the slide F⁵, as already described, the spring E⁸ will be under tension, and as soon as the downward pressure is removed from the upper end of the rod the spring will react to pull the rod upward and operate the bolts, as already described.

By the act of the voter entering the booth and closing the gate after him the rod E⁶ is pressed down and the lower bolt of both of the locks is withdrawn from the notches in the edge of the slides. At this stage of the operation all of the bolts are withdrawn from the notches in the edges of the slides E' and E² and the inner end of the upper bolt of each lock is resting against the edge of its slide, being pressed against by the lock-spring. Either of the slides E' or E² is now free to move to a limited extent, that is to say, the slide E² may be moved up, so as to open the straight-ticket aperture X, or the slide E' may be moved down, so as to open all of the mixed-ticket apertures $e$; but both slides cannot be moved together for reasons which I will now explain.

If the slide E² is moved up, its upper edge will abut against the lower edge of the slide E', and simultaneously the upper bolt in the lower lock will enter one of the notches $e^4$ in the slide E² and lock the slide E², so that it cannot again be moved down. Neither can the slide E' be moved down, because its lower edge is abutting against the upper edge of the slide E². When the parts are in the position shown in Fig. 6, if the slide E' be moved down its lower edge will abut against the upper edge of the slide E², and simultaneously the upper bolt of the upper lock will enter a notch in the slide E' to lock the slide and prevent upward movement thereof. Neither can the slide E² then be moved upward, because its upper edge is abutting against the lower edge of the slide E'.

In connection and coöperation with the mechanism for actuating, locking, and unlocking the ratchet-wheel, which I have already described, I provide additional locks connected with the frame A³ and operated by the gate and adapted to prevent manipulation of the rod J, by which the slide F⁸ is operated. (See Fig. 3.) The segment-plate D³ is secured to and turns with the gate D. The plate D³ has integral hooks $d'$ and $d^2$, adapted to respectively engage with the upturned end $d^4$ of the slide D⁴ and the lever $d^3$, connected with the slide D⁵. The plate D⁶ is secured to the frame A³ in any suitable manner. The guide D⁷ is integral with the plate D⁶. The slides D⁴ and D⁵ move in the guide D⁷ parallel to each other. The lever $d^3$ is fulcrumed on the bolt $d^4$ on the plate D⁶ and has a pivotal connection $d^5$ with one end of the slide D⁵. The spring D⁸ has one end secured to the plate D⁶ and its other end connected with the upturned part $d^4$ of the slide D⁴. The spring D⁹ has one end secured to the plate D⁶ and its other end connected with the lever $d^3$, as shown. Near the outer end of the rod J are two circumferential grooves $j$ and $j'$, as shown in Fig. 11.

When the gate is closed and the parts occupy the relative positions shown in Figs. 2 and 3, the slide D⁵ is in engagement with the notch $j$ and prevents outward movement of the rod J.

When the gate is open and the rod J is pushed out to its limit, the slide D⁴ is in engagement with the notch $j'$ and prevents inward movement of the rod. It is apparent then that the rod J cannot be tampered with or moved by hand either when the gate is open or when it is closed.

During the operation of opening the gate the hook $d'$ on the segment-plate D³ engages with the lever $d^3$, causing the lever to withdraw the slide D⁵ and disengage it from the notch $j$ in the rod J. Simultaneously the movement of the hood $d^2$ away from the end $d^4$ of the slide D⁴ permits the spring D⁸ to react and move the slide D⁴ into position to enter the notch $j'$ and lock the rod J at its outer limit.

During the operation of closing the gate the hook $d'$ is withdrawn from the lever $d^3$, permitting the spring D⁹, which has been distended in opening the gate, to react and move the slide D⁵ into position to engage with the notch $j$ in the rod J. Simultaneously the hook $d^2$ engages with the end $d^4$ and withdraws the slide D⁴ from the notch $j'$, permitting inward movement of the rod J until the notch $j$ comes in line with the slide D⁵. Thereupon the spring D⁹ further reacts and pushes the slide D⁵ into the notch $j$, thereby again locking the rod J until such time as the gate is again opened.

From the foregoing it is apparent that the slides controlling the opening and closing of the apertures e and X are so guarded and double-locked that they cannot be moved or manipulated in any way when the gate is open.

When the voter is inside of the booth and the gate is closed after him, but not before the gate is completely closed, he may move one slide once only for the purpose of opening the aperture or apertures necessary for voting the ticket of his choice, and having moved one slide he thereby locks the other slide and effectually closes against him all the apertures except those necessary for voting the ticket of his choice, and neither of the slides can again be moved nor can any of the apertures be again opened or closed until after he has left the booth and the gate has again been closed.

By the use of my method and apparatus, what is known as the "straight ticket" may be voted, that is to say, a vote may be cast for all of the offices for which candidates are named by any one of the political parties having a ticket in the field to be voted for at that election, without the voter being required to specifically designate each of the offices for which he may cast a vote, or a mixed ticket may be voted, that is to say, the voter may cast his vote for a candidate for each and every or any office for which canditates are named on any of the official ballots of the respective parties, and may specifically designate his choice of the several candidates named by the several parties having a candidate to be voted for, or he may cast a vote or votes for a person or persons not named on any of the official ballots, but having elected to vote the straight ticket he cannot afterward vote a mixed ticket, neither can he vote a straight ticket as a whole after having elected to vote a mixed ticket.

The official ballots used in connection with my apparatus correspond in number and designation to the number and designation of the political parties having tickets nominated to be voted for at an election. These official ballots are arranged side by side on the front of the cabinet and are protected by the glass $A^5$, as shown in Fig. 1, in which "Pro.," "Rep.," "Dem.," and "Pop." designate the official ballots of the Prohibition, Republican, Democratic, and Populist parties, respectively. On each ballot is printed in the same order the title or designation of each office for which candidates are in nomination to be voted for at the election. On the ballot of each party under each official title or designation is printed the name of the candidate of that party for the designated office.

The official ballots are so placed on the front of the cabinet that the designation of each office, as "President," "Presidential electors," "Governor," "Secretary of State," &c., is in range with one of the apertures e in the face-plate E and all the like designations on all of the ballots, as, for example, all of the "Governor" designations are in range with the same aperture and with each other.

A rubber stamp b is provided and named or designated by a suitable number or symbol corresponding to each party having an official ballot in place on the cabinet. These stamps are preferably adapted to print on the tally sheet or strip $G^3$ the words "Pro.," "Rep.," "Dem.," or "Pop.," which are respectively abbreviations of the words "Prohibition," "Republican," "Democratic," and "Populist;" but a greater or less number of other suitably-designated stamps to designate and represent a greater or less number of parties or different parties may be used without departing from the spirit of my invention.

In addition to the above-described stamps I usually provide three other properly-designated stamps adapted to imprint the words "Yes," "No," and "Misc.," the latter being an abbreviation of the word "miscellaneous." The stamps designated "Yes" and "No" are used for the purpose of printing on the tally-sheet, through an aperture in range with a proposition printed on the official ballots, a vote for or against said proposition, as, for example, "A proposition to issue bonds for the construction of water-works." Said proposition would have its alloted space on the official ballots and would be placed in range with an aperture e, so that the proposition may be voted upon the same as candidates for the several offices on the official ballots are voted for.

The lowest aperture below the lower end of the slide E' is preferably used for voting on propositions submitted and is always open, so that every voter may vote on the proposition, whether he votes a straight ticket or a mixed ticket.

The stamp designated "Misc." is used where a miscellaneous or unclassified vote is cast, as, for example, a vote cast for a person whose name is not printed on any of the official ballots. This stamp is used in the following manner: Assume that the voter wishes to record his vote for the office of governor for some person whose name is not printed on any of the official ballots. He will write on a strip of paper the name of the person for whom he wishes to vote and the designation of the office and will then stamp the word "Misc." in the aperture adjacent to the office of "Governor" for which he wishes to vote and will then deposit the written slip in the box at the lower end of the cabinet by inserting it through the slot $a'$. This being done, it will be found when the votes are counted that there is a written ticket in the box at the lower end of the cabinet corresponding to every imprint of the word "Misc." on the tally-sheet.

I lay special stress and value upon the fact that under my system of recording the votes the voter has ocular demonstration of the character of the vote which he casts, that is to say, if he votes the Democratic or the Republican ticket he sees the word "Dem." or "Rep." printed before his eyes, and does not in any way depend on the operation of any mysterious and unseen mechanism to record his vote. In other words, instead of setting in motion mechanism which may or may not properly record his vote, he himself records his vote in plain legible characters and sees for himself that it is so recorded. He votes by sight and not by faith alone.

The tally-sheet $G^3$ preferably consists of a long sheet or strip of paper ruled substantially as shown in Fig. 13. In this view I have shown a tally-sheet adapted to accommodate a record of all the votes cast at an election at which there are four parties having candidates in the field to be voted for; also adapted to receive a record of all the votes cast for or against a proposition on which affirmative or negative votes may be cast; also adapted to set forth a complete summary of all the votes as recorded. The tally-sheet $G^3$ is ruled longitudinally into the spaces corresponding in number and designation to the offices for which there are candidates on the ticket of the party having candidates for the largest number of offices and propositions submitted to be voted for. It is also ruled into transverse spaces corresponding in number and designation to the parties having candidates in the field. At the head of the transverse spaces the names of the several parties are printed, one in each space. Under all of the party headings are printed in succession the designations of all of the offices for which there are candidates to be voted for, and in each party column under the appropriate designation is printed the name or names of the candidate or candidates of that party for the designated office. Adjacent and parallel to the transverse ruling containing the party tickets of the several parties are transverse columns corresponding in number and designation to the several parties, also a column marked "Total," adapted to receive the extensions of the votes cast for the respective candidates.

The tally-sheet may be of indefinite length, and one tally-sheet may serve for a number of elections. In case a single tally-sheet is used for two or more elections, the beginning and the ending of the tally of any one the elections is clearly indicated by the judges or other authorized officers opening all the apertures in the face-plate before the voting begins and stamping through each and all of said apertures a number of party designations, one on top of the other on the tally-sheet, thus forming a mingled stripe extending transversely across the tally-sheet, which is easily distinguishable from the votes printed on the tally-sheet. A similar stripe is printed by the officers in like manner at the conclusion of the voting. By this means the ending of one tally is distinctly separated from the beginning of another.

My method and apparatus for vote-recording are especially adapted for use under the Australian system of voting, under which the voter may by a single operation of the mechanism cast his vote for the whole ticket of either party, or may cast his vote for a mixed ticket chosen by him from among all of the candidates named on all of the official ballots or party tickets. It is also adapted to cumulative voting in the following manner: Under the cumulative system of voting each party has two candidates for an office, say, for example, representative. Each voter is entitled to three votes, which he may cast, first, all for one candidate of one party; second, he may divide his votes between the two candidates of any one party, or, third, he may distribute them among the candidates of the several parties. In cumulative voting two apertures for that office will be required, one for each candidate standing for any one of the parties. In the first case he would imprint through the appropriate aperture in range with the name of the candidate the designation of the party of the candidate for whom he wishes to vote, leaving blank the space under the aperture in range with the name of the other candidate of the same party. In the second case he would imprint the party designation through the aperture in range with the names of both candidates of one of the parties. In the third case he would imprint in the several apertures in range with the names of the candidates for whom he wishes to vote the designation of the party on whose ticket the names of those candidates occur.

The method of voting with the apparatus herein described is as follows: The voter enters the booth and closes the gate after him. The act of closing the gate unlocks the slides $E'$ and $E^2$. If he wishes to vote the straight ticket of either party, he pushes up the knob $E^{10}$, thereby opening the aperture X. He then takes one of the stamps $b$, designated by the name, number, or symbol of the party of his choice, and imprints his vote through the opening X on the tally-sheet G. If he wishes to vote a mixed ticket, he presses down the knob $E^9$, thereby moving the slide $E'$ to open all the apertures $e$, the aperture X being then closed and locked against him. He then selects the appropriate stamps and imprints on the tally-sheet his vote for the candidates of his choice for the several offices, or for or against the propositions submitted to be voted upon. The voter then retires from the booth, leaving the gate open. The next voter enters the booth and closes the gate after him, and records his vote as already described; and this operation is repeated as often as there are voters to vote.

The hereinbefore-described apparatus is that which I have found in practice to be the best adapted for use under my method of voting, but it is obvious that any other suitable apparatus may be used which is provided with a plate having suitably-guarded apertures corresponding in number and arrangement to the number and arrangement of the offices for which candidates are to be voted for, and provided with a tally-sheet and means for imprinting or marking thereon the votes cast for the candidates for the respective offices.

Having fully described my invention, what I claim as new, and desire to secure by Letters Patent, is—

1. The herein-described vote-recording apparatus consisting of a cabinet; a plate attachable to said cabinet and having apertures corresponding in number and position to the designations of the respective offices for which there are candidates to be voted for, irrespective of the number of said candidates; a ballot or ballots attachable to said cabinet, and having official designations registering with the apertures in said plate, also having in range with said apertures the names of the candidates of the several parties for each of said offices respectively; an intermittently-movable tally-sheet within said cabinet contiguous to said apertures; and means adapted to print through said apertures on said tally-sheet the party designations of the respective candidates for which votes are cast; as set forth.

2. In a vote-recording apparatus the means adapted to facilitate the insertion, adjustment and removal of the tally-sheet in the cabinet; consisting of the rolls $G$, $G'$ the plates $G^2$, the spindles $g$, $g'$, $g^2$, the shaft $F^2$, the plate $F$, the standard $F'$, the screws $F^3$, $F^6$, and the jam-nuts $F^4$, in combination with; the cabinet within which the rolls are supported, and a tally-sheet connected with said rolls, as set forth.

3. In a vote-recording apparatus the means adapted to automatically close and lock the voting-apertures when the gate of the booth is open; consisting of the slides $E'$, $E^2$, the spring $E^4$ between said slides, the upper and lower locks on the face-plate, the lower bolt of the upper lock engaging with the slide $E'$ to prevent downward movement of that slide, and the lower bolt of the lower lock engaging with the slide $E^2$ to prevent upward movement of that slide; the rod $E^6$ provided with cams and the spring $E^8$ adapted to react and move the rod $E^6$ upward, in combination with; the cabinet and the face-plate on the cabinet having apertures with which the apertures in the slides register, as set forth.

4. In a vote-recording apparatus the locks $E^5$ each provided with two spring-bolts, the slides $E'$, $E^2$, provided with notches adapted to receive the bolts, the upper bolt of the upper lock being adapted when pushed out to prevent upward movement of the slide $E'$ and the lower bolt of the same lock being adapted to prevent downward movement of the slide $E'$, the lower bolt of the lower lock being adapted to prevent upward movement of the slide $E^2$ and the upper bolt of the lower lock being adapted to prevent downward movement of the same slide, the spring interposed between the slides $E'$ and $E^2$, the spring $E^3$ connected with the slide $E'$ and adapted to react to pull the slide upward, the rod $E^6$ having cams adapted to move the bolts of the locks $E^5$, the spring $E^8$ connected with the rod $E^6$ and adapted to react to pull the rod upward, in combination with; the cabinet, a face-plate on the cabinet, a frame on the cabinet provided with a gate adapted to engage with the rod $J$, the rod $J$, the slide $F^8$ connected with the rod $J$ and provided with a cam $f^2$ engaging with the rod $E^6$ and the spring $K$ supported on the cabinet and adapted to react to move the slide $F^8$; all coöperating for the purpose of locking and unlocking the slides $E'$ and $E^2$, as set forth.

5. In a vote-recording apparatus having an intermittently-moving tally-sheet and mechanism for actuating same, the means adapted to lock said actuating mechanism; consisting of a rod $J$ provided with notches $j$, $j'$, a tube $J'$ inclosing said rod, the guide $D^7$ connected with the tube, the slides $D^4$, $D^5$ moving in the guide $D^7$, and means adapted to move said slides alternately inward and outward, as set forth.

6. In a vote-recording apparatus the gate having a segment-plate $D^3$ provided with hooks $d'$, $d^2$, the spring $D^2$ connected with said gate, the slides $D^4$ and $D^5$ adapted to be moved in one direction by the fingers $d^2$ and $d'$ respectively, and adapted to be moved in the opposite direction by the spring $D^8$ and $D^9$ respectively, the guide $D^7$ accommodating the slides $D^4$, $D^5$, the tube $J'$ with which the guide is connected, the rod $J$ within the tube and having notches in which said slides engage in combination with; the cabinet, an intermittently-moving tally-sheet within the cabinet actuated by the mechanism connected with the rod $J$, and the frame supported on the cabinet and supporting the gate; all coöperating to control the movement of the tally-sheet by the opening and closing of the gate, as set forth.

7. In a vote-recording apparatus the combination of, a cabinet; a rectangular frame detachably connected with said cabinet; a gate and curtains supported on said frame; an apertured face-plate on said cabinet; slides within said cabinet having apertures registering with the apertures in said face-plate; and locking mechanism engaging with said slides and operated by said gate; as set forth.

8. In a vote-recording apparatus, the combination of; a cabinet provided with supporting-plates and having in its lower part a receptacle for written ballots, also having in its back a door; an apertured face-plate on the front of said cabinet; slides having apertures registering with the apertures in said face-plate; a rotatable roll contiguous to said slides; a tally-sheet on said roll; and means adapted to print on said tally-sheet against said roll and through the apertures in said face-plate and slides; as set forth.

9. In a vote-recording apparatus the combination of a cabinet, means connecting said cabinet with a supporting structure, a frame detachably connected with the top of said cabinet, curtains connected with said frame, an apertured face-plate connected with said cabinet, slides connected with said face-plate and adapted to open and close the apertures therein, locks on the face-plate engaging with said slides, a tally-sheet, rolls within the cabinet carrying the tally-sheet, means adapted to intermittently rotate said rolls and move said tally-sheet contiguous to the apertures in the face-plate, means adapted to imprint votes on said tally-sheet through the apertures in the face-plate, and a gate on the frame connected with the cabinet and adapted to operate locks controlling the mechanism actuating the tally-sheet substantially as set forth.

10. In a vote-recording apparatus of that class employing an intermittently-moving tally-sheet, the means adapted to lock the mechanism actuating the tally-sheet, in such manner as to prevent untimely movement thereof, consisting of a suitably-supported ratchet-wheel H provided with holes $h^2$ and connected with one of the rolls carrying the tally-sheet, a reciprocating slide $F^8$ provided with a double cam $f'$, a bar $F^9$ provided with a bolt $F^{10}$ adapted to enter the holes $h^2$ and a pawl $h$ engaging with the teeth of the ratchet-wheel, all coöperating as set forth.

11. In a voting apparatus, the combination of; a cabinet; rotatable rolls within said cabinet; a tally-sheet connected with said rolls a face-plate contiguous to said tally-sheet and provided with apertures; a reciprocating rod J; a slide connected with said rod and provided with a pawl adapted to engage with the teeth of a ratchet-wheel; a ratchet-wheel connected with one of said rolls a pawl adapted to engage with the teeth of and prevent backward movement of said ratchet-wheel; and a spring adapted to react and move said slide, also adapted to retain the pawl on the slide in engagement with the ratchet-wheel; as set forth.

12. In a vote-recording apparatus the combination of; a cabinet; a perforated face-plate secured to said cabinet; perforated slides moving in guides and adapted to abut against each other; locks having alternately-operating bolts engaging with said slides; and a tally-sheet contiguous to the apertures in said slides; as set forth.

13. In a vote-recording apparatus, the combination of; a cabinet; a perforated face-plate secured to the cabinet; a perforated slide $E'$ working in guides in said face-plate; a perforated slide $E^2$ working in guides in the slide $E'$; a spring interposed between and acting against said slides; a lock secured to said face-plate and having two alternately-operating bolts engaging with the slide $E'$ one of said bolts serving to limit the upward movement of said slide, and the other serving to limit the downward movement of said slide; a lock secured to said face-plate and having two alternately-operating bolts engaging with the slide $E^2$, one of said bolts serving to limit the upward movement of said slide and the other serving to limit the downward movement of said slide; and an intermittently-moving tally-sheet contiguous to the apertures in said slides; as set forth.

14. In a vote-recording apparatus the combination of a cabinet, means connecting said cabinet with a supporting structure, a frame detachably connected with the top of said cabinet, curtains connected with said frame, an apertured face-plate connected with said cabinet, slides connected with said face-plate and adapted to open and close the apertures therein, locks on the face-plate engaging with said slides, a tally-sheet, rolls within the cabinet carrying the tally-sheet, means adapted to intermittently rotate said rolls and move said tally-sheet contiguous to the apertures in the face-plate, and a gate on the frame connected with the cabinet and adapted to operate locks controlling the mechanism actuating the tally-sheet substantially as set forth.

In witness whereof I have hereunto subscribed, at Springfield, Illinois, this 9th day of May, 1895.

WILLIAM A. SWAREN.

Witnesses:
 THOS. C. MATHER, Jr.,
 FRANK B. HENNEY.